(12) United States Patent
Wang et al.

(10) Patent No.: US 11,527,048 B2
(45) Date of Patent: Dec. 13, 2022

(54) METHOD FOR SIMULATING SETTING OF PROJECTOR BY AUGMENTED REALITY AND TERMINAL DEVICE THEREFOR

(71) Applicant: Optoma Corporation, New Taipei (TW)

(72) Inventors: Wen-Tai Wang, Hsin-Chu (TW); Chi-Lin Lee, Hsin-Chu (TW); Te-Hsin Chen, Hsin-Chu (TW); Ekrem Tapan, Hsin-Chu (TW)

(73) Assignee: Optoma Corporation, New Taipei (TW)

(*) Notice: Subject to any disclaimer, the term of this patent is extended or adjusted under 35 U.S.C. 154(b) by 0 days.

(21) Appl. No.: 17/353,837

(22) Filed: Jun. 22, 2021

(65) Prior Publication Data

US 2021/0407204 A1  Dec. 30, 2021

(30) Foreign Application Priority Data

Jun. 24, 2020 (TW) .................................. 109121471

(51) Int. Cl.
*G06T 19/00* (2011.01)
*G06T 7/62* (2017.01)
*G06T 15/20* (2011.01)

(52) U.S. Cl.
CPC .............. *G06T 19/006* (2013.01); *G06T 7/62* (2017.01); *G06T 15/20* (2013.01)

(58) Field of Classification Search
None
See application file for complete search history.

(56) References Cited

U.S. PATENT DOCUMENTS

| 2009/0207322 A1* | 8/2009 | Mizuuchi | ............. H04N 9/3194 |
| | | | 348/E3.048 |
| 2015/0070389 A1* | 3/2015 | Goto | ........................ G06T 7/00 |
| | | | 345/633 |

(Continued)

FOREIGN PATENT DOCUMENTS

| TW | 201604811 | 2/2016 |
| TW | I538516 | 6/2016 |

(Continued)

OTHER PUBLICATIONS

"Office Action of Taiwan Counterpart Application", dated Aug. 24, 2021, p. 1-p. 6.

*Primary Examiner* — Michael J Cobb
(74) *Attorney, Agent, or Firm* — JCIPRNET

(57) ABSTRACT

A method for simulating setting of a projector by augmented reality (AR) includes: activating an AR application on a terminal device; performing, through an image capturing element of the terminal device, dimension measurement on a space where a projector is to be disposed to obtain a space dimension; selecting a placement reference point of the projector and a display reference point of a projection picture; generating, according to the space dimension, the placement reference point, and the display reference point, a simulation picture on the terminal device when the projector projects the projection picture in the space; adjusting the projection picture and/or the projector in the simulation picture to generate an adjusted simulation picture; and comparing the adjusted simulation picture with projector parameter data of projector models to recommend at least one projector model to a user for selection or inputting, by the user, a custom projector model.

18 Claims, 10 Drawing Sheets

(56) References Cited

U.S. PATENT DOCUMENTS

| | | | | |
|---|---|---|---|---|
| 2017/0103584 A1* | 4/2017 | Vats | ............... | G06T 19/20 |
| 2018/0007341 A1* | 1/2018 | Okuley | ............... | H04N 9/3194 |
| 2018/0014008 A1* | 1/2018 | Sugiura | ............... | G03B 21/142 |
| 2018/0103237 A1* | 4/2018 | Chaney | ............... | H04N 7/147 |
| 2019/0116356 A1* | 4/2019 | Matoba | ............... | H04N 9/3102 |
| 2019/0340799 A1 | 11/2019 | Dryer et al. | | |
| 2019/0377192 A1* | 12/2019 | Ng-Thow-Hing | ..... | G09G 3/003 |
| 2019/0392630 A1* | 12/2019 | Sturm | ............... | G06T 19/006 |
| 2020/0112707 A1* | 4/2020 | Kobayashi | ............... | H04N 9/3182 |
| 2021/0374982 A1* | 12/2021 | Velinov | ............... | G06T 7/507 |
| 2022/0264066 A1* | 8/2022 | Kitabayashi | ......... | H04N 9/3194 |

FOREIGN PATENT DOCUMENTS

| | | |
|---|---|---|
| TW | I574223 | 3/2017 |
| TW | I590189 | 7/2017 |
| TW | I628613 | 7/2018 |

* cited by examiner

METHOD FOR SIMULATING SETTING OF PROJECTOR BY AUGMENTED REALITY AND TERMINAL DEVICE THEREFOR

CROSS-REFERENCE TO RELATED APPLICATION

This application claims the priority benefit of Taiwan application serial no. 109121471, filed on Jun. 24, 2020. The entirety of the above-mentioned patent application is hereby incorporated by reference herein and made a part of this specification.

BACKGROUND

1. Technical Field

The disclosure relates to a method for simulating setting of a projector, and in particular, to a method for simulating setting of a projector by augmented reality and a terminal device therefor.

2. Description of Related Art

An existing method for simulating setting of a projector in a space requires a consumer to input a dimension of the space in which a projector is to be placed and a related specification value on the Internet, so as to recommend a projector suitable for the space. However, this method is insufficient to make a user see a simulated scene of mounting the projector. As such, it is not easy for the user to know whether the projector is really suitable to be mounted in the space.

In addition, the above method further requires the user to measure and input the dimension of the space in which the projector is to be placed before the user acquires the recommended projector. The method is cumbersome and inconvenient for common users who are not familiar with measurement skills or have no tools.

Besides, a trial calculation of current projection distance on the market is performed by using a projector data simulation manner, and cannot be applied to an actual mounting space. As a result, it is not easy to imagine an actual situation after mounting. In addition, at present, distance, length, space measurements, and the like on the market to which an augmented reality (AR) technology is applied are mostly single-point plane measurements, through which a space can be measured. However, a correspondence between a projector placement position and a space cannot be more appropriately simulated. Moreover, although a variety of products and brands may have made realistic simulation to which the AR technology is applied, stereoscopic space placement positions and coordinates of objects and relative positions of corresponding projection screens and projection target areas cannot be accurately determined.

Therefore, in the technical field of projectors, there is a need to develop a technology which may use the AR technology to perform space measurement, may simulate projector setting, and may recommend a suitable projector to a user based on a simulation result.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a method for simulating setting of a projector by augmented reality (AR) and a terminal device therefor through which a user may effectively know a condition of a scenario simulation of the projector combined with a real scene.

Other objectives and advantages of the disclosure may be further understood from the technical features disclosed in the disclosure.

To achieve one or a part of or all of the above objectives or other objectives, the disclosure provides a method for simulating setting of a projector by AR, and the method includes the following steps. An AR application is activated on a terminal device. Through an image capturing element of the terminal device, dimension measurement is performed on a space in which the projector is to be disposed to obtain a space dimension. At the terminal device, a placement reference point of the projector and a display reference point of a projection picture are selected. According to the space dimension, the placement reference point of the projector, and the display reference point of the projection picture, a simulation picture is generated on the terminal device when the projector projects the projection picture in the space. The projection picture and/or the projector in the simulation picture are/is adjusted on the terminal device according to a requirement of a user to generate an adjusted simulation picture. The adjusted simulation picture is compared with projector parameter data of a plurality of projector models to recommend at least one projector model in line with the space dimension to the user for selection, or, by the user, a custom projector model is inputted.

According to an implementation, in the method for simulating setting, the step of adjusting the projector in the simulation picture further includes the following step. A position of the placement reference point of the projector is adjusted to generate the adjusted simulation picture.

According to an implementation, in the method for simulating setting, the step of adjusting the position of the placement reference point of the projector further includes the following step. A placement position and a projection angle of the projector are adjusted.

According to an embodiment, in the method for simulating setting, the step of adjusting the projection picture in the simulation picture further includes the following step. A size, a direction, or an angle of the projection picture is adjusted.

According to an embodiment, in the method for simulating setting, the parameter data of the plurality of projector models is downloaded from an external server to the terminal device. Alternatively, according to an embodiment, in the method for simulating setting, the parameter data of the plurality of projector models is stored in an external server.

According to an embodiment, the method for simulating setting further includes the following step. When the user inputs the custom projector model, parameter data of the custom projector model is compared with the adjusted simulation picture to determine whether the custom projector model is in line with the space dimension.

According to an embodiment, the method for simulating setting further includes the following step. When the custom projector model is not in line with the space dimension, by the terminal device, at least one projector model from the plurality of projector models is further recommended to the user for selection. According to an embodiment, the method for simulating setting further includes the following step. When the custom projector model is not in line with the space dimension, by the terminal device, the user is prompted to adjust the placement reference point of the projector.

According to an embodiment, the method for simulating setting further includes the following step. After the projector model or the custom projector model is selected, in the simulation picture, a simulated projection of an image or photograph played by the projector is generated.

According to an embodiment, the method for simulating setting further includes the following step. An optimal viewing position in the simulation picture is provided for the user to simulate viewing the simulated projection of the projector.

To achieve one or a part of or all of the above objectives or other objectives, according to another embodiment, the disclosure provides a terminal device for simulating setting of a projector by AR, including: a display, an image capturing element, and a processor. The processor controls the display and the image capturing photographing element and is capable of executing an AR application. The processor is configured to: activate the AR application on the terminal device, perform, through the image capturing element of the terminal device, dimension measurement on a space in which the projector is to be disposed to obtain a space dimension, select, at the terminal device, a placement reference point of the projector and a display reference point of a projection picture, generate, according to the space dimension, the placement reference point of the projector, and the display reference point of the projection picture, a simulation picture on the display when the projector projects the projection picture in the space, adjust the projection picture and/or the projector in the simulation picture on the terminal device according to a requirement of a user to generate an adjusted simulation picture, and compare the adjusted simulation picture with projector parameter data of a plurality of projector models to recommend at least one projector model in line with the space dimension to the user for selection, or input, by the user, a custom projector model.

According to an embodiment, in the terminal device, the step of adjusting, by the processor, the projector in the simulation picture further includes the following. A position of the placement reference point of the projector is adjusted to generate the adjusted simulation picture.

According to an embodiment, in the terminal device, the step of adjusting the position of the placement reference point of the projector further includes the following. A placement position and a projection angle of the projector are adjusted.

According to an embodiment, in the terminal device, the step of adjusting, by the processor, the projection picture in the simulation picture further includes the following. A size, a direction, or an angle of the projection picture is adjusted.

According to an embodiment, in the terminal device, the parameter data of the plurality of projector models is downloaded from an external server to the terminal device. According to an embodiment, in the terminal device, the parameter data of the plurality of projector models is stored in an external server.

According to an embodiment, in the terminal device, the processor is further configured to: when the user inputs the custom projector model, compare parameter data of the custom projector model with the adjusted simulation picture to determine whether the custom projector model is in line with the space dimension.

According to an embodiment, in the terminal device, the processor is further configured to: when the custom projector model is not in line with the space dimension, further recommend, by the processor, at least one projector model from the plurality of projector models to the user for selection. According to an embodiment, in the terminal device, the processor is further configured to: when the custom projector model is not in line with the space dimension, prompt, by the processor, the user to adjust the placement reference point of the projector.

According to an embodiment, in the terminal device, the processor is further configured to: after the projector model or the custom projector model is selected, generate, in the simulation picture, a simulated projection of an image or photograph played by the projector.

According to an embodiment, in the terminal device, the processor is further configured to: provide an optimal viewing position in the simulation picture for the user to simulate viewing the simulated projection of the projector.

Through the above simulation method or terminal device, a user may easily measure a space dimension, and an AR application may automatically recommend suitable projector models for the user to select. In addition, through the above AR technology, the user may further view a result of a simulation picture combined with a real scene on a display of the terminal device, and may effectively know the condition of a projector after mounting, instead of just imagining in the previous manner.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The above and other technical contents, features, and effects of the disclosure are clearly presented in detailed descriptions of an exemplary embodiment with reference to the drawings. Directional terms mentioned in the following embodiments, such as up, down, left, right, front, and back, refer only to directions with reference to the accompanying drawings. Therefore, the directional terms used are for illustrating and not for limiting the disclosure.

In the embodiment, a result of simulated setting of a projector in a space is combined with an actual space by using an augmented reality (AR) application executed on a terminal device. A user may view a simulation result of setting of the projector in the space through the terminal device, and thereby, knows the condition of the projector actually mounted.

Figure 1:
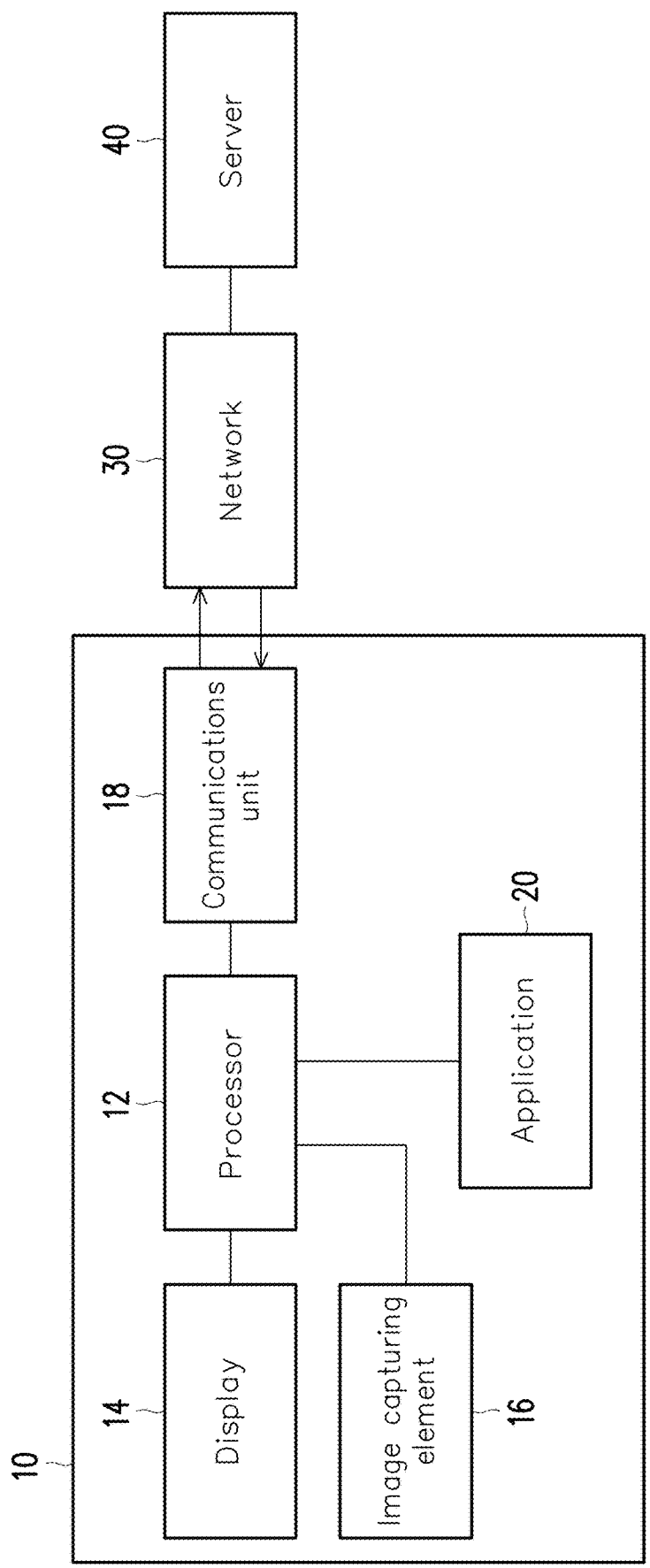
FIG. 1 is a schematic architectural diagram illustrating a terminal device.

The terminal device herein may be a handheld device such as a mobile phone, a smartphone, or a tablet computer (for example, a pad) provided that an AR application can be installed and executed on the terminal device. FIG. 1 is a schematic architectural diagram of a terminal device. As shown in FIG. 1, a terminal device 10 includes at least a processor 12, a display 14, and an image capturing element 16, but is not limited thereto. An application 20 is installed in the terminal device 10. The display 14 may be a display interface, which may display various applications 20 executed by the terminal device 10, and a user may start the application 20 through an image icon displayed by the display 14. In addition, an execution result of the application 20 may also be displayed on the display 14. The image capturing element 16 is, for example, a camera or a video camera integrated with the terminal device 10. The image capturing element 16 may photograph and capture images of an environment, or coordinate with a distance calculator of an AR application to measure space distances and sizes. The processor 12 of the terminal device 10 may control the display 14 and the image capturing element 16 and may execute an AR application (one of the applications 20).

In addition, the terminal device 10 further includes a communications unit 18, whereby the terminal device may be connected to a network (such as the Internet) 30 through a wired or wireless manner, and may communicate with a remote server 40 through the network 30. As described later, a method for simulating setting of a projector by AR is performed in the embodiment, and after an AR application is started on the terminal device 10, projectors of various models and parameters thereof may be downloaded from a server 40, or the user may query a model and parameters of a projector from the server through the terminal device 10. In the embodiment, the processor 12 is coupled to the communications unit 18, the display 14, the image capturing element 16, and the application 20.

Before the simulation method of the embodiment is described, the parameters of the projectors and meanings thereof are briefly explained to facilitate understanding. The projectors of various models have respective parameters. A space geometry size, a projection picture size, and the like required during setting of a projector may be obtained through the parameters to enable the user to know whether the projector is suitable or enable the user to select a suitable projector according to projector parameters based on his/her own setting space.

Figure 2A:
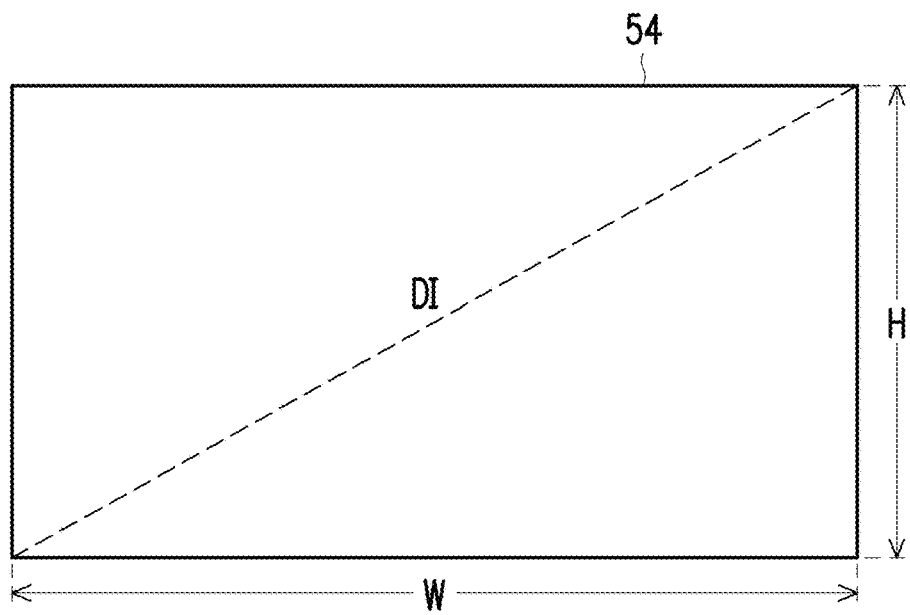
FIG. 2A to FIG. 2D are schematic diagrams of respective descriptions of projector parameters.

The projector parameters are briefly described below with reference to FIG. 2A to FIG. 2D. The projector parameters that is mentioned later in the embodiment include, for example, but are not limited to, a screen size (projection picture size), a vertical offset, a horizontal offset, a throw ratio (TR), a zoom range, and the like. As shown in FIG. 2A, the screen size should be the most general parameter, that is, a screen size that may correspond to a projection picture projected by the projector, which may be defined by a width W, a height H, a diagonal DI, and the like. Generally, the width W, the height H, and the diagonal DI satisfy the relation of $DI^2=W^2+H^2$.

In addition, the projector parameters may further include a throw ratio (TR). The TR is generally determined by a ratio (that is, $D_0/W$) of a perpendicular distance $D_0$ between a projector 52 and a projection picture 54 (projection screen) to the width W of the projection screen 54. In addition, a TR range is defined as a range between a maximum TR (TR_max) and a minimum TR (TR_min). In addition, the projector parameters may further include an image zoom range, which is generally defined as 1−(TR_max/TR_min).

Figure 2B:
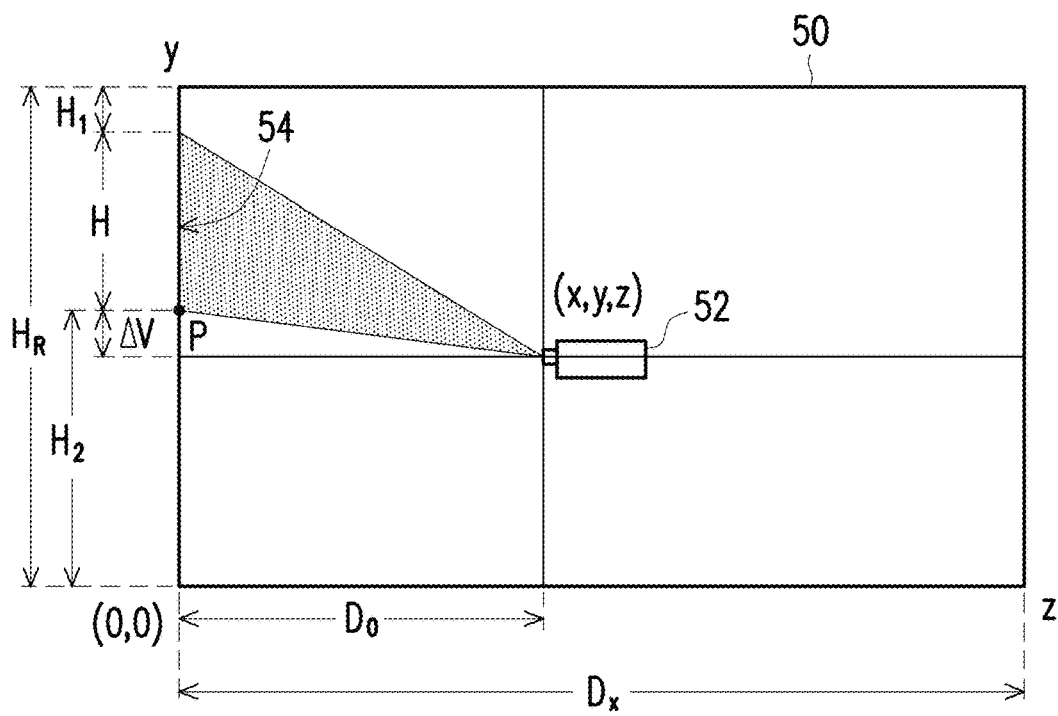
Figure 2C:
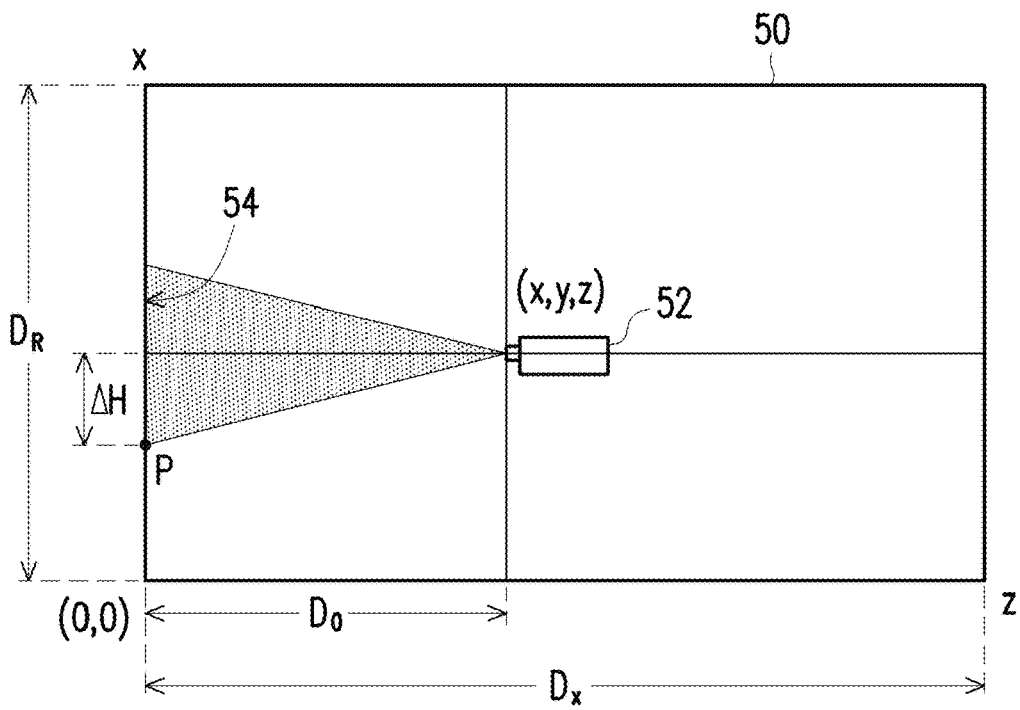
Figure 2D:
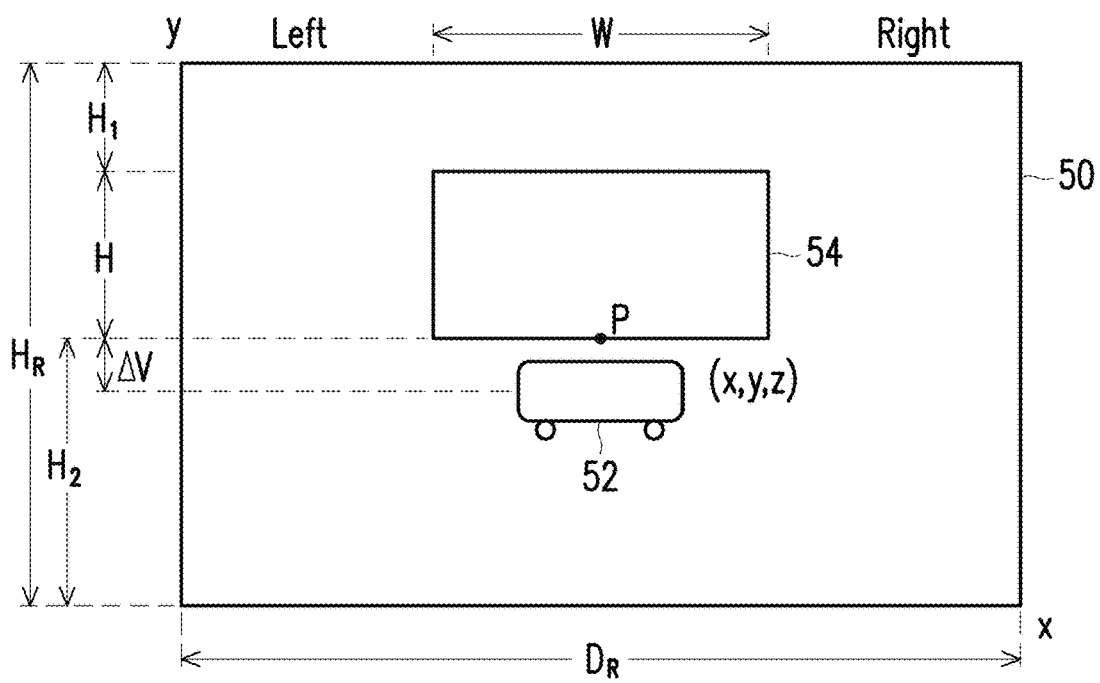

FIG. 2B and FIG. 2C illustrate a vertical offset ΔV and a horizontal offset ΔH of a projection picture respectively. In addition, in FIG. 2B to FIG. 2D, it may also be seen that some space setting parameters of the projector 52 are set, such as a height $H_R$, a depth $D_X$, and a width $D_R$ of a setting space (or room) 50 for the projector 52. In addition, as shown in FIG. 2B and FIG. 2D, for the projection picture (projection screen) 54, a position of the projection picture 54 in a vertical direction may also be set according to a distance H1 from the top (ceiling) of the space downward to an upper edge of the projection picture 54, a distance H2 from the bottom (floor) of the space upward to a lower edge of the projection picture 54, and the like. In addition, as shown in FIG. 2D, for the projection picture 54, a position of the projection picture 54 in a horizontal direction may also be set according to a distance from a left wall surface of the space shown in the figure rightward to a left edge of the projection picture 54, a distance from the right side of the space shown in the figure leftward to a right edge of the projection picture 54, and the like. Through the above projector parameters, in the subsequent recommendation or suggestion, a projector model suitable for the space 50 can be found for the user in conjunction with the method for simulating setting.

In the following method for simulating setting of the projector, after the setting space 50 is measured, for example, the projector parameters are automatically inputted and a projector model suitable for the space 50 is accordingly recommended to the user. In this way, the user does not need to compare parameters of projectors of various models to find an appropriate projector.

Figure 3:
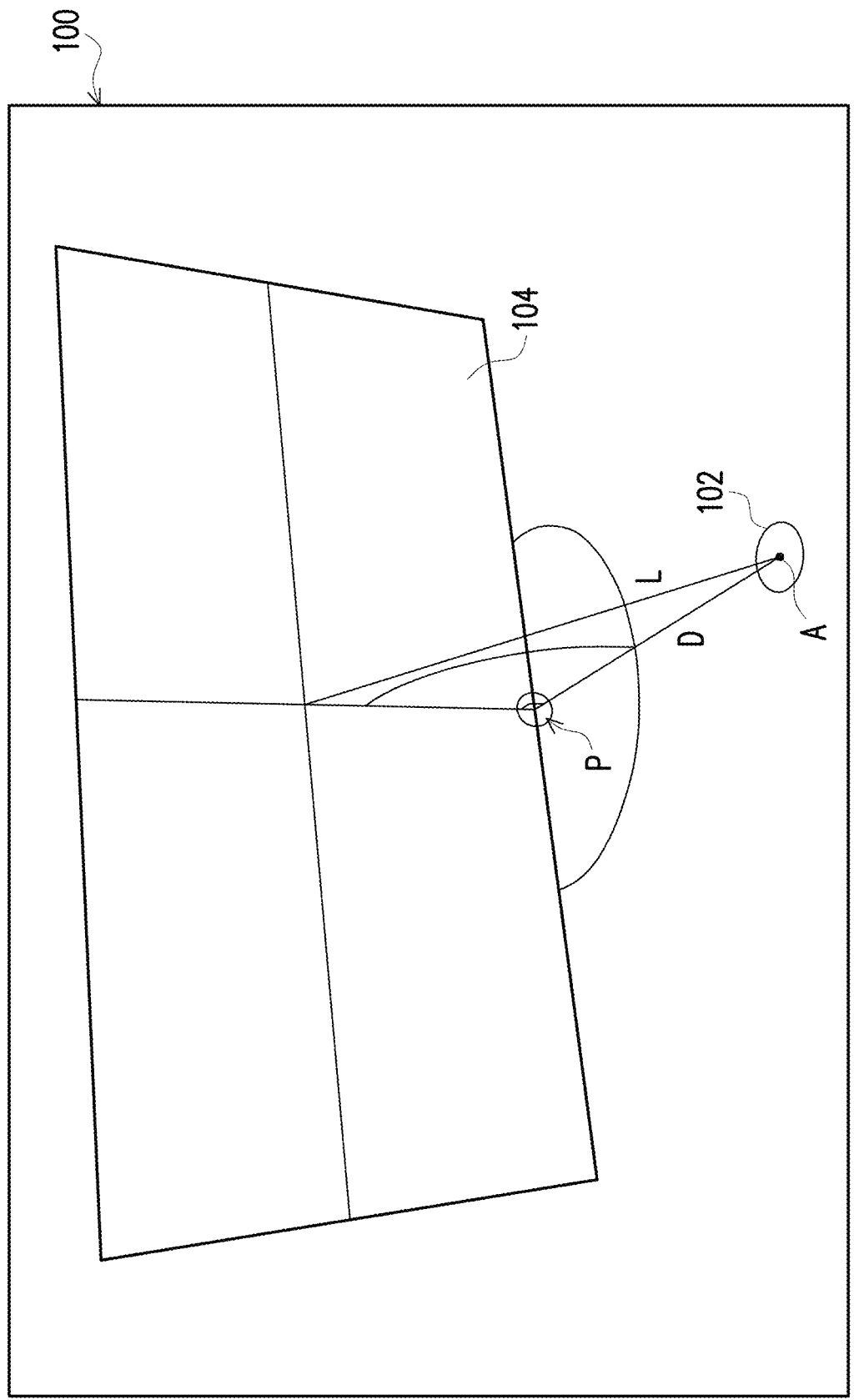
FIG. 3 is a schematic diagram illustrating display of a simulation picture on the terminal device.

FIG. 3 is a schematic diagram of display of a simulation picture on a terminal device. As shown in FIG. 1 and FIG. 3, a simulation picture 100 is displayed on the display 14 of the terminal device 10. The simulation picture 100 includes a space in which a projector is to be disposed, and a virtual projector (hereinafter referred to as projector) 102 and a virtual projection picture (hereinafter referred to as projection picture) 104 in the space. In the simulation picture 100, a placement reference point A in which the projector 102 is to be placed and a display reference point P of the projection picture 104 are selectable, that is, the placement reference point A and the display reference point P are set through a touch on the terminal device 10 or by using an input device such as a mouse. Once the user selects the placement reference point A of the projector 102 and the display reference point P of the projection picture 104, the simulation picture 100 as shown in FIG. 3 may appear on the display 14 of the terminal device 10.

Figure 4:
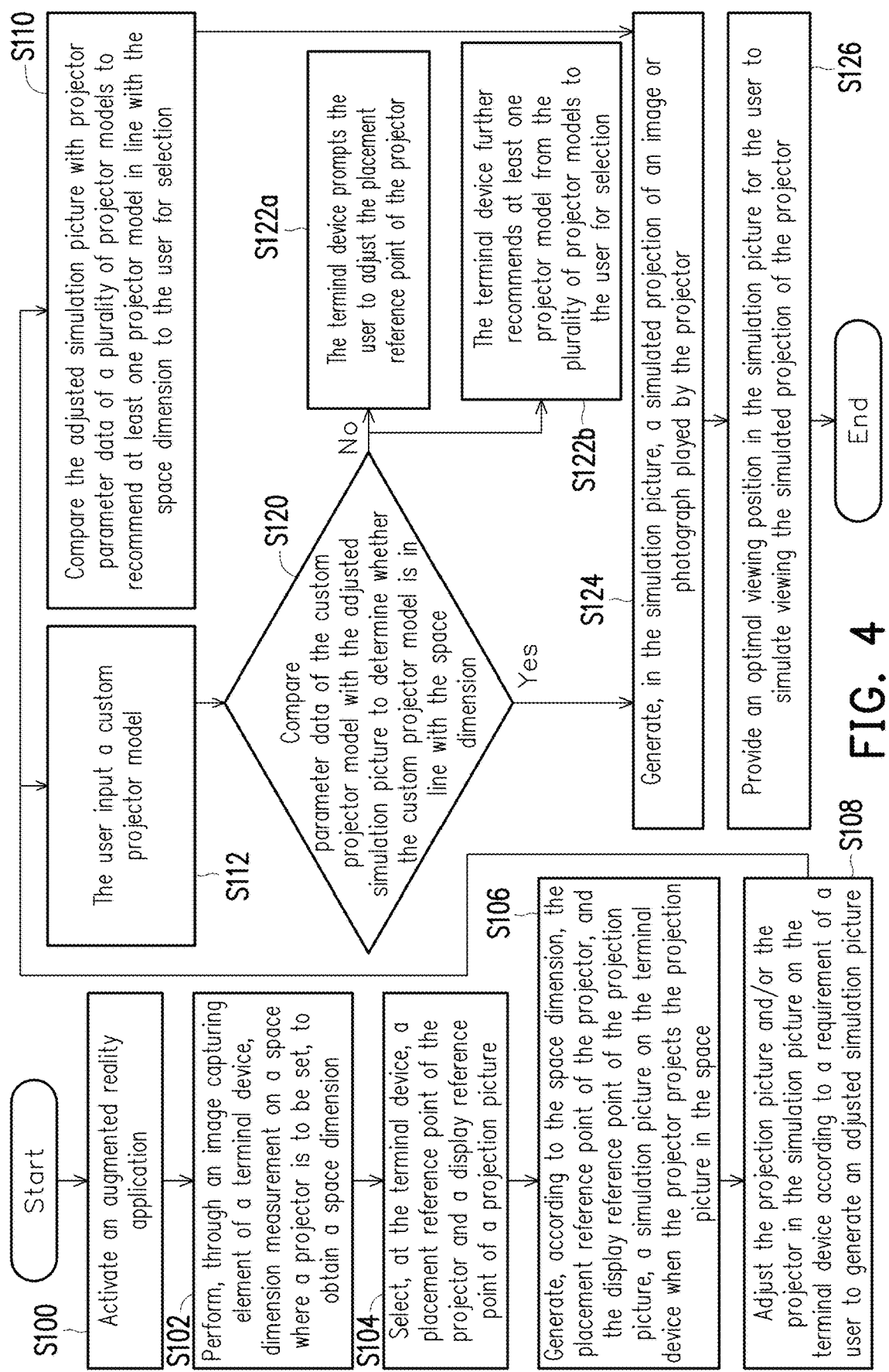
FIG. 4 is a schematic flow chart illustrating a method for simulating setting of a projector by AR according to an embodiment.

FIG. 4 is a schematic flow chart illustrating a method for simulating setting of a projector by AR according to the embodiment. As shown in FIG. 1 and FIG. 4, firstly, in step S100, the user may activate an AR application through the terminal device 10.

Next, in step S102, the user may perform, through an image capturing element 16 of the terminal device 10, dimension measurement on a space in which the projector is to be disposed, to obtain a space dimension. The space dimension may be, for example, a height $H_R$, a depth $D_X$, a width $D_R$, and the like of the space in the room shown in FIG. 2B to FIG. 2D. When the AR application activates the image capturing element 16, it may further include asking the user whether the user can obtain a permission to use the image capturing element 16. Superimposition of an AR image and an actual space image is displayed on the display 14 of the terminal device 10. In addition, if a terminal device 10 does not have the image capturing element 16 built therein, an external image capturing element may also be used to be connected to the terminal device 10.

Next, in step S104, a placement reference point A of the projector and a display reference point P of a projection picture are selected at the terminal device 10. According to the embodiment, after executing the AR application, the user may touch the terminal device 10 on the display 14 of the terminal device 10 or use an input device such as a mouse to select and move the placement reference point A of the virtual projector 102 and the display reference point P of the virtual projection picture 104 that are selected, so that the virtual projector 102 and the virtual projection picture 104 may be in positions to be set by the user.

Next, in step S106, a simulation picture 100 when the projector projects the projection picture in the space is generated on the terminal device 10 according to the space dimension, the placement reference point A of the projector, and the display reference point P of the projection picture. The placement reference point A of the virtual projector 102 is, for example, the origin on an optical axis of a projection lens when the projection picture of the projector is projected from the projection lens, and the display reference point P of the virtual projection picture 104 is, for example, a center point of a lower edge of the projection picture 104. In this case, the processor 12 of the terminal device 10 may execute the AR application according to the space dimension obtained in step S102 and the placement reference point A of the virtual projector 102 and the display reference point P of the virtual projection picture 104 selected in step S104. The processer 12 obtains a space image of a real scene also through the image capturing element 16, and through the AR application, the generated simulation picture 100 (as shown in FIG. 3) is displayed on the display 14 of the terminal device 10. Accordingly, the user may see the simulation picture 100 on the display 14 by executing the AR application.

Next, in step S108, the projection picture 104 and/or the projector 102 in the simulation picture 100 are/is adjusted on the terminal device 10 according to a requirement of a user to generate an adjusted simulation picture.

Figure 5:
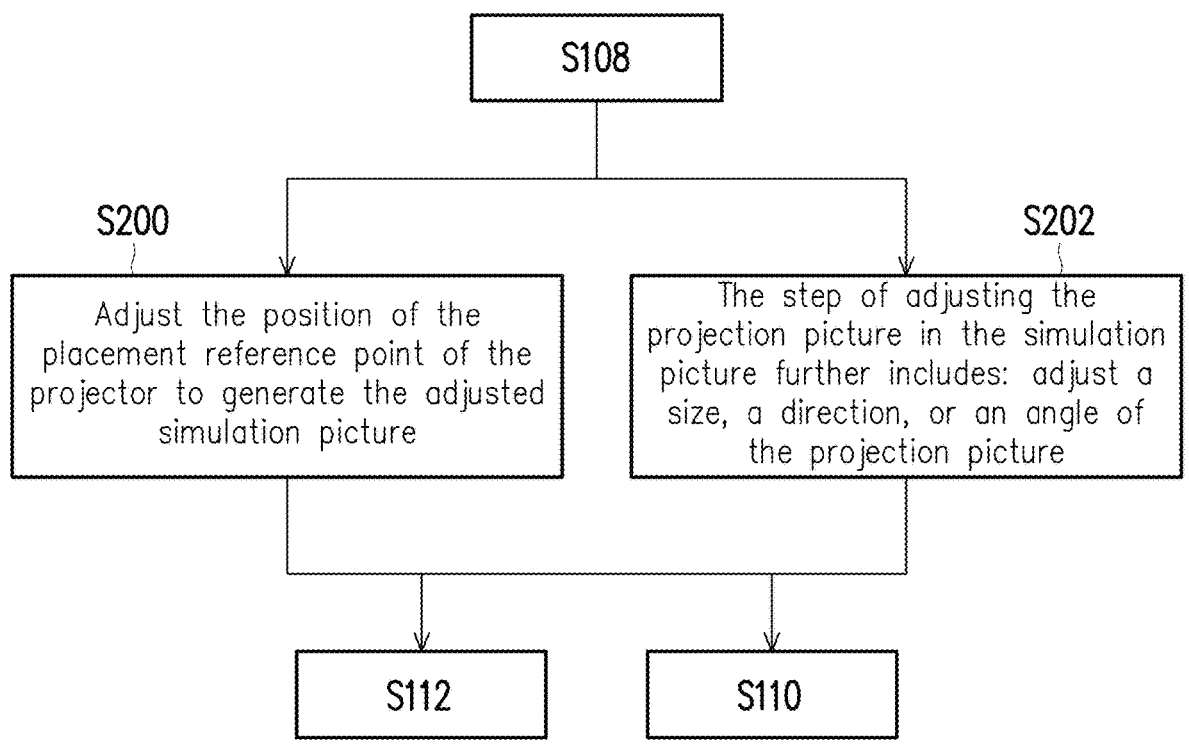
FIG. 5 is a schematic flow chart illustrating adjustment of a simulation picture in FIG. 4.

FIG. 5 further illustrates a schematic flow chart illustrating adjustment of the simulation picture in FIG. 4. In step S108, when the simulation picture is adjusted, the projection picture 104 and the projector 102 may be simultaneously adjusted, or one of the projection picture 104 and the projector 102 is adjusted. In addition, there are no mandatory requirements on a sequence of the adjustment steps S200 to S202 shown in FIG. 5, the order of steps S200 to S202 may be changed arbitrarily, or only one of the steps is performed, or the steps may be all adjusted. Here, the process shown in FIG. 5 is only one of the above variations and does not limit the implementation of this embodiment.

Figure 6:
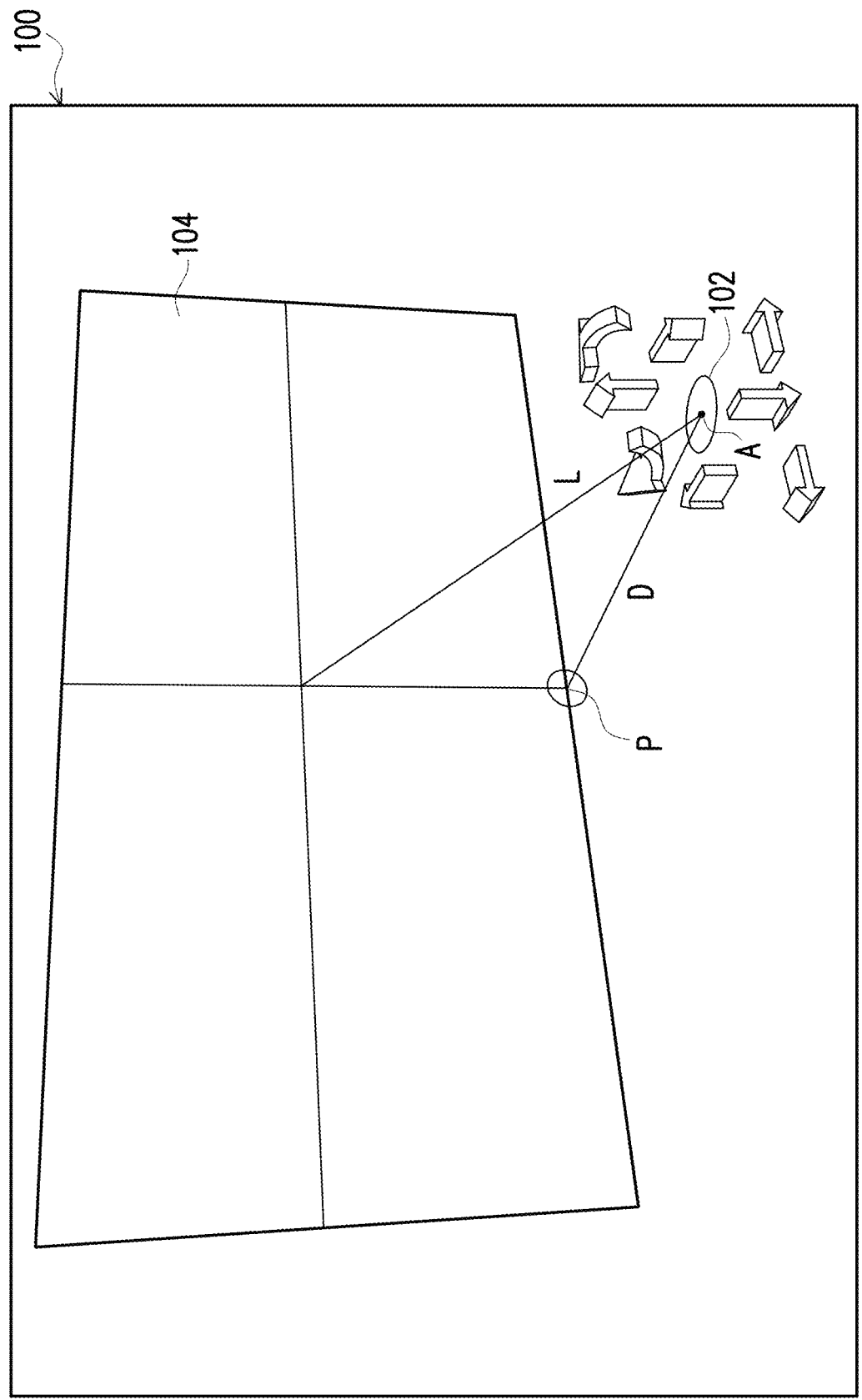
FIG. 6 is a schematic diagram illustrating adjustment of a placement position of a projector on the terminal device.

As shown in FIG. 5, in step S200, the adjusting the projector 102 in the simulation picture 100 in FIG. 4 further includes: adjusting a position of the placement reference point A of the projector 102 to generate the adjusted simulation picture. FIG. 6 illustrates adjusting the position of the placement reference point of the projector on the terminal device. As shown in FIG. 6, the user may adjust the position of the placement reference point A of the projector 102 in the simulation picture 100 displayed on the display 14 of the terminal device 10. The adjustment may be that the user touches the placement reference point A displayed on the display 14 to adjust the position. In an implementation, the adjustment of a position of the placement reference point A of the projector 102 may further include adjusting a placement position and a projection angle of the projector 102. For example, as shown in FIG. 6, it can be seen from the arrows drawn that the user may the position of the placement reference point A up, down, left, right, and the like, and change a projection angle of the position of the placement reference point A, that is, rotate it up or down as shown in the figure. Accordingly, the adjusting a position of the placement reference point A may further achieve adjusting the projection picture 104 in the simulation picture 100.

Figure 7:
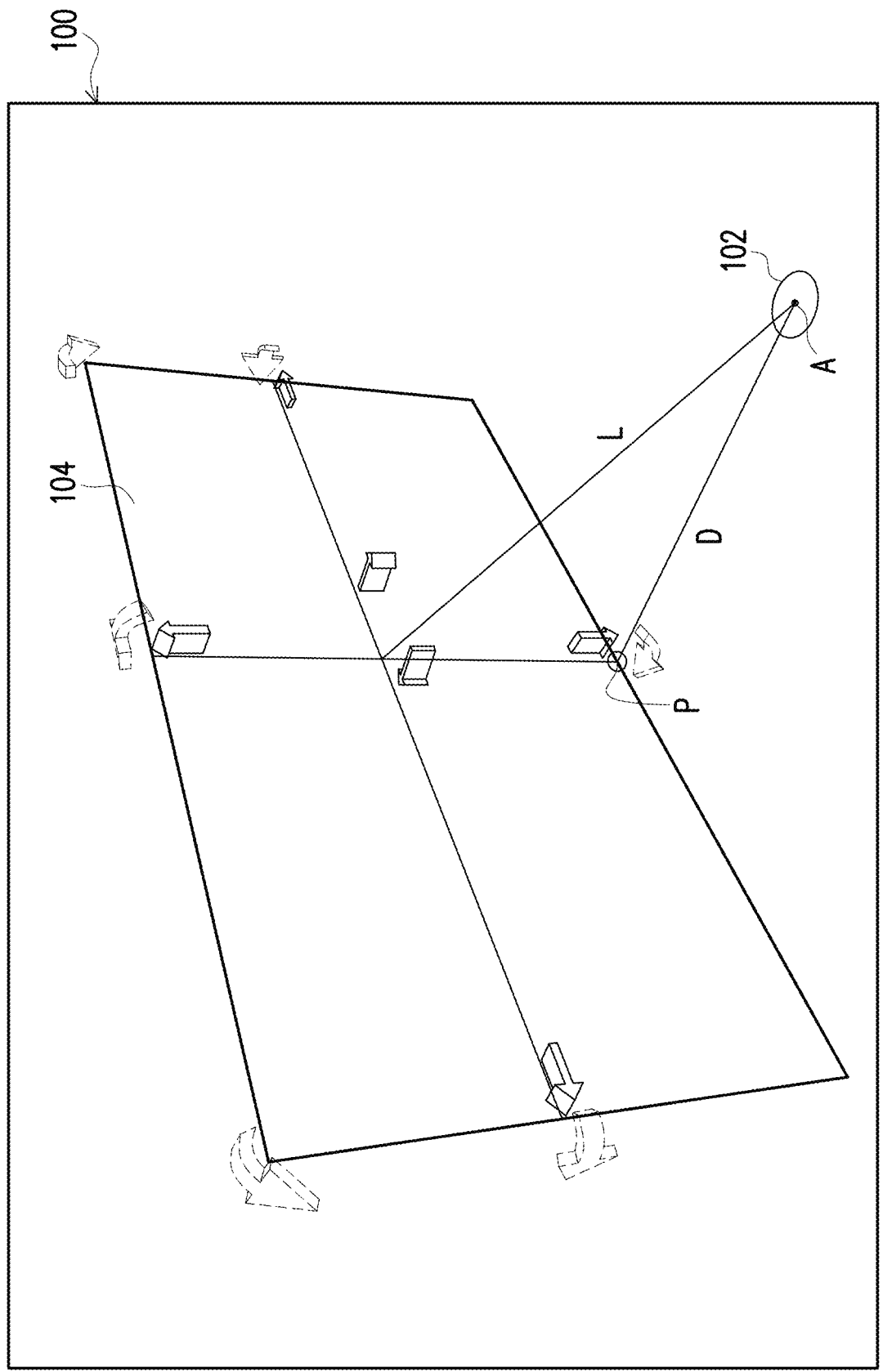
FIG. 7 is a schematic diagram illustrating adjustment of a size, a direction, or an angle of a projection picture on the terminal device.

In addition, as shown in FIG. 5, in step S202, the adjusting the projection picture 104 in the simulation picture 100 may further include: adjusting a size, a direction, or an angle of the projection picture 104. FIG. 7 is a schematic diagram illustrating adjustment of a size, a direction, or an angle of a projection picture on the terminal device. As shown in FIG. 7, the user may adjust the projection picture 104 projected from the virtual projector 102 in the simulation picture 100 displayed on the display 14 of the terminal device 10. The adjustment may be that the user touches the corners, the sides, the center position, and the like in the projection picture 104 to adjust the position. For example, as shown in FIG. 7, it can be seen from the solid arrows that the user may move approximately the midpoint of each of four sides of the projection picture 104 up, down, left, right, and the like respectively, or move approximately the center position of the projection picture 104 back and forth or the like. In addition, as can be seen from the dotted arrows in FIG. 7, for example, the user may rotate approximately upper two vertex angles and approximately the midpoint of each side of the projection picture 104. Through the above operation, the user may adjust the size, direction, or angle of the projection picture 104 shown in the simulation picture 100 through the display 14 of the terminal device 10.

In general, if the projection picture 104 in the simulation picture 100 shown in FIG. 3 has a problem, such as not in line with a size, direction, or angle of a projection wall/a screen to be projected on, the projection picture 104 may be rotated or moved in the adjustment manner shown by the solid or dotted arrows in FIG. 7, so as to change the projection picture 104. Alternatively, the placement reference point A of the projector 102 may also be adjusted through the arrow shown in FIG. 6. Positions in which the projection picture 104 and the projector 102 are to be placed in the space may be gradually determined in the adjustment manner (the steps shown in FIG. 5) shown in FIG. 6 or FIG. 7.

Next, still refer to the schematic diagram of FIG. 4. After the user adjusts the simulation picture 100, an adjusted simulation picture may be obtained. Next, in step S110, the adjusted simulation picture is compared with projector parameter data of a plurality of projector models to recommend at least one projector model in line with the space dimension to the user for selection. That is, after the user has adjusted the simulation picture 100 including the projection picture 104 and the projector 102, this is a position where the user is to set the projector in the future and a projection manner that the users wants to achieve. In this case, the terminal device 10 compares projector parameters (at least the parameters as depicted in FIG. 2A to FIG. 2D) of the plurality of projector models with size and space relations, and the like presented in the adjusted simulation picture 100, determines, based on the projector parameters, whether any of the plurality of projector models meet the requirement of the adjusted simulation picture 100, selects at least one projector therefrom, and recommends suitable projector models according to the selected projector for the user to select.

In this case, the terminal device 10 may display a menu on the display 14 for the user to select a projector model. The user may then select a desired projector model from the menu. In the above process, when enabling the AR application, the plurality of projector models and the projector parameter data corresponding thereto are downloaded from the server 40 to the terminal device 10 through the communications unit in FIG. 1 and over the network 30. In an implementation, the terminal device 10 may read data from the server 40 for comparison only when making comparison, without downloading the projector models and the parameters to a local terminal device 10.

Further, in addition to the AR application of the embodiment providing a list of projector recommendations for the user, the user may also input a projector model of interest. After the process of adjusting the simulation picture as shown in FIG. 5, step S110 in FIG. 4 or step S112 in FIG. 4 may be followed. In step S112, the user inputs a custom projector model. In this way, the user may have a high degree of freedom to select a projector model of interest.

Next, in step S120, parameter data of the custom projector model input by the user is compared with the adjusted simulation picture to determine whether the custom projector model is in line with the space dimension. According to this embodiment, even if the user inputs a custom projector model according to his or her need or preference, the AR application still compares parameters of the custom projector model (the examples as shown in FIG. 2A to FIG. 2D) with the adjusted simulation picture 100 obtained in step S108 to determine whether the custom projector model is in line with the space.

When the result determined in step S120 is that the custom projector model is not in line with the space dimension, that is, when the determination result is "no," the AR application may alert and proceed to step S122a. In this case, the terminal device 10 may prompt the user to adjust the placement reference point A of the projector 102. In addition, when the determination result is "no", the AR application alerts and may alternatively proceed to step S122b; in this case, the terminal device 10 further recommend at least one projector model from the plurality of projector models for the user to select.

Figure 8:
FIG. 8 is a schematic diagram illustrating an example of displaying the simulation picture on the terminal device.

At this point, the terminal device 10 activates an AR application, measures a dimension of a space in which a projector is to be mounted, makes the user adjust the simulation picture 100, and finally compares the adjusted simulation picture 100 with a plurality of projector models and parameters thereof to recommend suitable projector models for the user to select. FIG. 8 is a schematic diagram illustrating an example of displaying the simulation picture on the terminal device. In the example shown in FIG. 8, the simulation picture 100 including the virtual projector 102 and the virtual projection picture 104 produced by the AR application of the embodiment may be displayed on the display through a terminal device 10 of a tablet PC. It can be seen from FIG. 8 that the method for simulating setting of a projector by AR in the embodiment may effectively and reliably make the user know the overall effect of the projection picture, the projector, and the setting space after the projector is actually mounted.

In this way, the user can easily measure the dimension of the space without comparing parameters of a plurality of projector models, and the AR application can automatically recommend suitable projector models for the user to select. Moreover, through the above AR technology, the user may further view a result of a simulation picture combined with a real scene on the display 14 of the terminal device 10, and may effectively know a condition of a projector after mounting, instead of just imagining in the previous manner.

Figure 9:
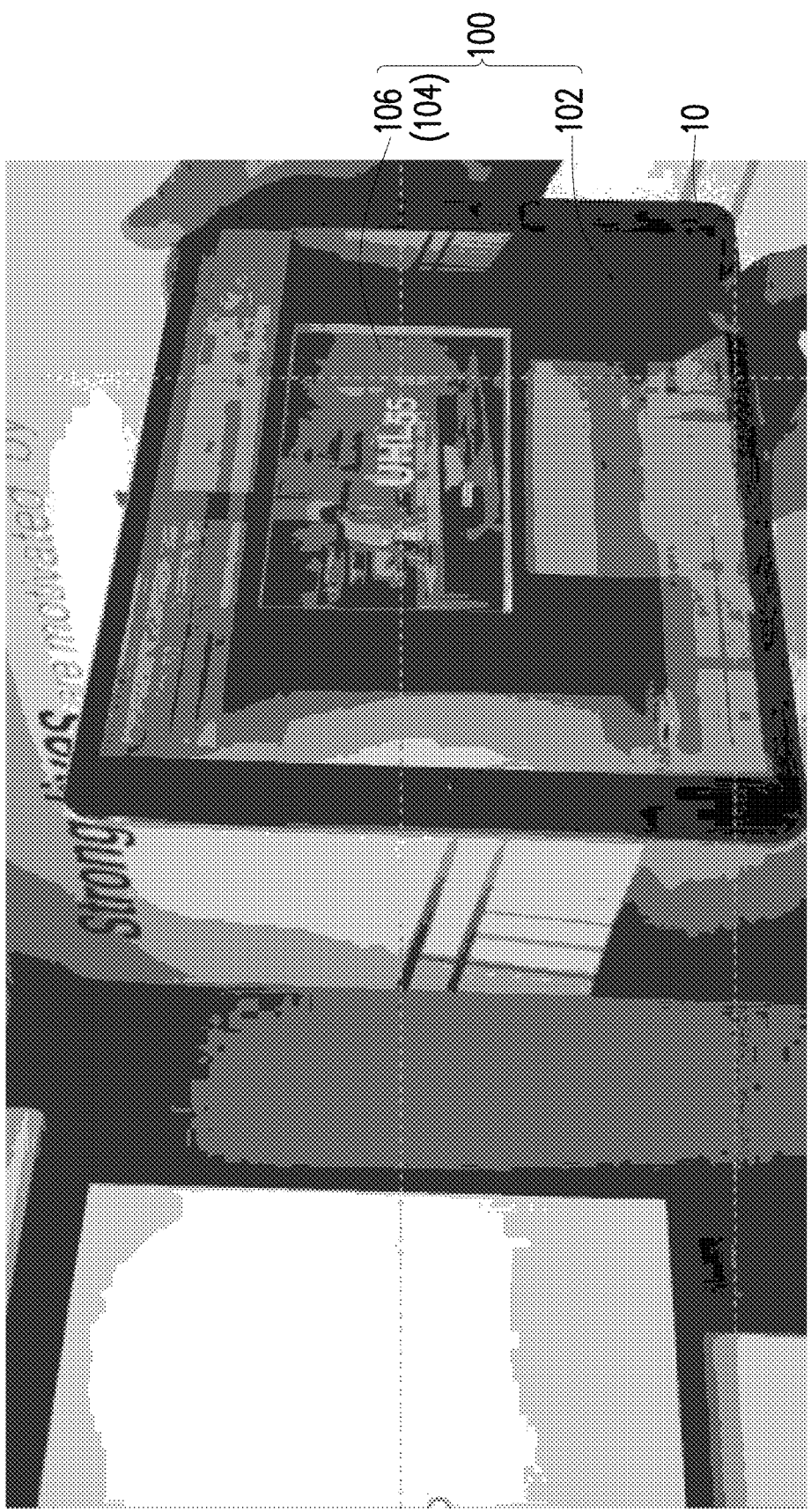
FIG. 9 is a schematic diagram illustrating an example of simulating viewing a simulated projection of the projector on the terminal device.

In addition, according to this embodiment, the method for simulating setting of a projector can not only help the user to select a suitable projector model, but also simulate a projection. As shown in FIG. 4, in step S124, after the projector model or the custom projector model is selected, a simulated projection of an image or photograph played by the projector is generated in the simulation picture 100. That is, regardless of whether a suitable projector is selected according to a list of projector recommendations provided by the AR application through step S110 or a suitable projector is simulated by customizing a projector model through steps S112 and S120, and the like, the processor 12 of the terminal device 10 may make the AR application further generate, on the projection picture 104 of the simulation picture 100, a simulated projection of an image or photograph played by the projector. Accordingly, the scenario simulation may be viewed by the user, and the user may further experience, through the AR technology, feelings and effects of a projection after the projector is actually mounted. FIG. 9 is a schematic diagram illustrating an example of simulating viewing a simulated projection of the projector on the terminal device. As shown in FIG. 9, through the AR technology of the embodiment, the user may clearly view a simulated projection 106 (104) of an image or photograph on the projection picture 100.

In addition, in step S126, the terminal device 10 may further make the AR application provide an optimal viewing position in the simulation picture 100 for the user to simulate viewing the simulated projection of the projector. For example, an optimal viewing position may be marked in the simulation picture 100, and the user may be guided to sit down or stand at the optimal viewing position, so as to actually know an effect of viewing the image or photograph played by the projector at the optimal viewing position. In this way, the user may be in a better position to plan an overall space, for example, placement positions of corresponding furniture, and the like.

In addition, as shown in FIG. 1, according to another embodiment of the disclosure, a terminal device 10 for simulating setting of a projector by AR is provided. The terminal device 10 may include at least a processor 12, a display 14, and an image capturing element 16. The processor 12 controls the display 14 and the image capturing element 16 and is capable of executing an AR application 20. The processor 12, the display 14, and the image capturing element 16 are not described herein. Refer to FIG. 1 for the descriptions thereof.

In addition, the processor 12 is configured to: activate the AR application 20 on the terminal device 10 (perform step S100 in FIG. 4), perform, through the image capturing element 16 of the terminal device 10, dimension measurement on a space in which the projector is to be disposed to obtain a space dimension (step S102 in FIG. 4), select, at the terminal device 10, a placement reference point A of the projector 102 and a display reference point P of a projection picture (step S104 in FIG. 4), generate, according to the space dimension, the placement reference point A of the projector, and the display reference point P of the projection picture, a simulation picture on the display 14 when the projector projects the projection picture in the space (step S106), adjust the projection picture 104 and/or the projector 102 in the simulation picture 100 on the terminal device 10 according to a requirement of a user to generate an adjusted simulation picture (step S108), and compare the adjusted simulation picture 100 with projector parameter data of a plurality of projector models to recommend at least one projector model in line with the space dimension to the user for selection (step S110), or input, by the user, a custom projector model (step S112).

In addition, the processor 12 may also be configured to perform related steps of the inputting, by the user, a custom projector model, for example, steps S120, S122a, S122b, and the like in FIG. 4, and the processor 12 may also be configured to perform step S124 in FIG. 4, that is, generate, in the simulation picture 100, a simulated projection of an image or photograph played by the projector. The processor 12 may also be configured to perform step S126 of FIG. 4, that is, provide an optimal viewing position in the simulation picture 100 for the user to simulate viewing the simulated projection of the projector. The processor 12 may also be configured to perform the steps of the adjusting a position of the placement reference point of the projector or the adjusting the projection picture in FIG. 5.

The above steps have been described in detail when the simulation method is previously described, the contents thereof are all applicable to the terminal device of this embodiment, and the descriptions thereof are omitted herein.

In addition, in the above descriptions, the user simulates through the terminal device at a projector mounting site. However, the simulation method can be extended to the application of remote services. For example, the user can use the above method to simulate the setting of the present projector, and at the same time, connect with a remote engineer through the network. Accordingly, the remote engineer can also use the AR application with the user to remotely view a simulation picture of simulating setting of a projector, and provide mounting advices and corresponding services in real time.

Based on the above, a field-domain real scene can be identified (room type and size) according to the method for simulating setting of a projector by AR and the terminal device thereof in the disclosure. For example, a space dimension can be easily measured by a distance calculator of the AR application in conjunction with an image capturing element. In addition, the display reference point of the projection picture and a locating point of the projector related to the display reference point can also be quickly located and confirmed by the AR application. Through the AR application, estimation of a distance between the projector and a wall (or a distance between the wall and the terminal device) can be easily calculated, and a projected object can be imaged on the wall. In addition, through an AR imaging technology, a stereoscopic space for imaging can also be easily adjusted. Besides, the disclosure can further provide the calculation of an optimal viewing position and a distance, and can also display a simulated projection in a real scene.

Through the embodiments of the disclosure, the user may easily measure a space dimension without comparing parameters of a plurality of projector models, and the AR application may automatically recommend suitable projector models for the user to select. Moreover, through the AR technology, the user may further view a result of a simulation picture combined with a real scene on the display of the terminal device and may effectively know the condition of a projector after mounting, instead of just imagining in the previous manner.

The foregoing descriptions are merely exemplary embodiments of the disclosure, and are not intended to limit the scope of implementations of the disclosure. Any simple equivalent changes and modifications made according to the claims or the specification of the disclosure shall still fall within the scope of the disclosure. In addition, any embodiment or claim of the disclosure does not need to achieve all the objectives or advantages or features disclosed by the disclosure. In addition, the abstract and the title are only used to assist in searching for patent documents, and are not intended to limit the scope of rights of the disclosure. In addition, the terms "first," "second," and the like mentioned in the specification or the claims are used only to name elements or to distinguish different embodiments or ranges, but are not intended to define the upper or lower limit of the number of elements.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred.

The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A method for simulating setting of a projector by augmented reality, comprising:
    activating an augmented reality application on a terminal device;
    performing, through an image capturing element of the terminal device, dimension measurement on a space in which the projector is to be disposed to obtain a space dimension;
    selecting, at the terminal device, a placement reference point of a virtual projector that indicates the projector and a display reference point of a virtual projection picture that is projected by the virtual projector;
    generating, according to the space dimension, the placement reference point of the virtual projector, and the display reference point of the virtual projection picture, a simulation picture on the terminal device by the augmented reality application, wherein the simulation picture is configured to simulate a projection picture projected by the projector in the space, wherein the simulation picture includes the virtual projection picture and an environment defined by the space dimension;
    adjusting a size, a direction or an angle of the virtual projection picture and/or a position of the placement reference point of the virtual projector in the simulation picture on the terminal device to generate an adjusted simulation picture; and
    comparing at least one relation of a size and a space presented in the adjusted simulation picture with projector parameter data of a plurality of projector models to recommend at least one projector model that works in the space dimension to be selected or instead input a custom projector model based on the adjusted simulation picture.

2. The method for simulating setting of the projector by augmented reality according to claim 1, wherein the step of adjusting the position of the placement reference point of the virtual projector further comprises adjusting a placement position and a projection angle of the virtual projector.

3. The method for simulating setting of the projector by augmented reality according to claim 1, wherein the parameter data of the plurality of projector models is downloaded from an external server to the terminal device.

4. The method for simulating setting of the projector by augmented reality according to claim 1, wherein the parameter data of the plurality of projector models is stored in an external server.

5. The method for simulating setting of the projector by augmented reality according to claim 1, further comprising: when the user inputs the custom projector model is inputted, comparing parameter data of the custom projector model with the size, the direction or the angle of the adjusted simulation picture to determine whether the custom projector model works in the space dimension.

6. The method for simulating setting of the projector by augmented reality according to claim 5, further comprising: when the custom projector model does not work in the space dimension, further recommending, by the terminal device, at least one projector model from the plurality of projector models to be selected.

7. The method for simulating setting of the projector by augmented reality according to claim 5, further comprising: when the custom projector model does not work in the space dimension, prompting, by the terminal device, adjusting the position of the placement reference point of the virtual projector.

8. The method for simulating setting of the projector by augmented reality according to claim 1, further comprising: after the projector model or the custom projector model is selected, generating an image, a photograph, or a video in the virtual projection picture of the simulation picture to simulate a projection of the image, the photograph, or the video played by the virtual projector.

9. The method for simulating setting of the projector by augmented reality according to claim 8, further comprising: providing an optimal viewing position to be indicated in the simulation picture for simulating viewing the projection of the virtual projector.

10. A terminal device for simulating setting of a projector by augmented reality, comprising: a display, an image capturing element, and a processor, wherein
    the processor is used to control the display and the image capturing element and is capable of executing an augmented reality application, wherein the processor is configured to:
    activate the augmented reality application on the terminal device;
    perform, through the image capturing element of the terminal device, a dimension measurement on a space in which the projector is to be disposed to obtain a space dimension;
    select, at the terminal device, a placement reference point of a virtual projector that indicates the projector and a display reference point of a virtual projection picture that is projected by the virtual projector;
    generate, according to the space dimension, the placement reference point of the virtual projector, and the display reference point of the virtual projection picture, a simulation picture on the terminal device by the augmented reality application, wherein the simulation picture is configured to simulate a projection picture projected by the projector in the space, wherein the simulation picture includes the virtual projection picture and an environment defined by the space dimension;
    adjust a size, a direction or an angle of the virtual projection picture and/or a position of the placement reference point of the virtual projector in the simulation picture on the terminal device to generate an adjusted simulation picture; and
    compare at least one relation of a size and a space presented in the adjusted simulation picture with projector parameter data of a plurality of projector models to recommend at least one projector model that works in the space dimension to be selected, or instead input a custom projector model based on the adjusted simulation picture.

11. The terminal device for simulating setting of the projector by augmented reality according to claim 10, wherein the processor is configured to adjust a placement position and a projection angle of the virtual projector in the simulation picture on the terminal device.

12. The terminal device for simulating setting of the projector by augmented reality according to claim 10, wherein the parameter data of the plurality of projector models is downloaded from an external server to the terminal device.

13. The terminal device for simulating setting of the projector by augmented reality according to claim 10, wherein the parameter data of the plurality of projector models is stored in an external server.

14. The terminal device for simulating setting of the projector by augmented reality according to claim 10, wherein the processor is further configured to compare parameter data of the custom projector model with the size, the direction or the angle of the adjusted simulation picture to determine whether the custom projector model works in the space dimension when the custom projector model is inputted.

15. The terminal device for simulating setting of the projector by augmented reality according to claim 14, wherein the processor is further configured to recommend at least one projector model from the plurality of projector models to be selected when the custom projector model does not work in the space dimension.

16. The terminal device for simulating setting of the projector by augmented reality according to claim 14, wherein the processor is further configured to prompt adjusting the position of the placement reference point of the virtual projector when the custom projector model does not work in the space dimension.

17. The terminal device for simulating setting of the projector by augmented reality according to claim 10, wherein the processor is further configured to generate an image, photograph, or a video in the virtual projection picture of the simulation picture to simulate a projection of the image, the photograph, or the video played by the virtual projector after the projector model or the custom projector model is selected.

18. The terminal device for simulating setting of the projector by augmented reality according to claim 17, wherein the processor is further configured to provide an optimal viewing position to be indicated in the simulation picture is provided by the processor for simulating viewing the projection of the virtual projector.

* * * * *